(12) United States Patent
Pedersen

(10) Patent No.: US 7,946,623 B2
(45) Date of Patent: May 24, 2011

(54) ROLL OVER PROTECTION SYSTEM

(75) Inventor: Roald Helland Pedersen, Gjøvk (NO)

(73) Assignee: Benteler Automobiltechnik GmbH, Paderborn (DE)

( * ) Notice: Subject to any disclaimer, the term of this patent is extended or adjusted under 35 U.S.C. 154(b) by 1 day.

(21) Appl. No.: 11/988,932

(22) PCT Filed: Jul. 18, 2005

(86) PCT No.: PCT/NO2005/000270
§ 371 (c)(1),
(2), (4) Date: Mar. 14, 2008

(87) PCT Pub. No.: WO2007/011227
PCT Pub. Date: Jan. 25, 2007

(65) Prior Publication Data
US 2009/0095554 A1 Apr. 16, 2009

(51) Int. Cl.
*B60R 21/13* (2006.01)
(52) U.S. Cl. .................................................. 280/756
(58) Field of Classification Search ............ 280/753, 280/756; 296/190.03; *B60R 21/13*
See application file for complete search history.

(56) References Cited

U.S. PATENT DOCUMENTS

| | | | | |
|---|---|---|---|---|
| 3,791,668 A | * | 2/1974 | Adams | 280/756 |
| 5,205,585 A | * | 4/1993 | Reuber et al. | 280/753 |
| 5,236,219 A | * | 8/1993 | Jambor et al. | 280/756 |
| 5,626,361 A | * | 5/1997 | Heiner | 280/756 |
| 5,655,791 A | * | 8/1997 | Nowack et al. | 280/756 |
| 6,296,278 B1 | * | 10/2001 | Zupancic et al. | 280/756 |
| 6,386,585 B1 | | 5/2002 | Muller et al. | |
| 6,805,378 B2 | * | 10/2004 | Berges et al. | 280/756 |
| 2003/0042722 A1 | | 3/2003 | Hovelmann et al. | |

FOREIGN PATENT DOCUMENTS

| | | |
|---|---|---|
| DE | 199 31 224 | 1/2001 |
| WO | 97/48506 | 12/1997 |
| WO | 2004/026628 | 4/2004 |

OTHER PUBLICATIONS

International Search Report issued in the International (PCT) Application of which the present application is the U.S. National Stage.
Patent Cooperation Treaty (PCT) International Preliminary Report on Patentability, issued Nov. 6, 2007 in International Application No. PCT/NO2005/000270.

* cited by examiner

*Primary Examiner* — Paul N Dickson
*Assistant Examiner* — Robert A Coker
(74) *Attorney, Agent, or Firm* — Wenderoth, Lind & Ponack, L.L.P.

(57) ABSTRACT

A roll over protection system for a passenger car, including at least one extended top unit (1) having substantially vertical beam(s) or tube(s) terminated or bridged by a connecting member (7) at their top ends. Initially in a crash, the upper part of the top unit only deforms by being bent backwards, thus creating a skid-plate against the ground and at the same time the survival room is impaired only negligibly.

12 Claims, 5 Drawing Sheets

ROLL OVER PROTECTION SYSTEM

BACKGROUND OF THE INVENTION

1. Technical Field

The present invention relates to a new concept for Roll Over Protection Systems (ROPS) for passenger cars, in particular cabriolets. It is useful for "pop up" (extendable) systems, but the general principle of the system cart advantageously be used also for fixed (non-extendable) ROPS.

In particular, the present invention relates to an improved system, giving advantages both within the protective scope in the case of a roll over accident, as well as cost and other benefits such as space utilization, less dependency on manufacturing tolerances and an improved guiding system (in the case of having an extendable system).

Many of the advantages and improvements are associated with the upper parts of a ROPS system, i.e. the "bar" itself. This improved bar (top unit) can either be a part of a cassette module, in which case two modules go into every car, or two top units can be installed in a common unit, such as a transverse beam module just behind the seats of the car. It is also within the inventive scope to use the invention for a single, wide system, covering the width of the car.

2. Description of the Related Art

There are a great number of such protection systems suggested in the prior art.

DE 197 81 835 T1 discloses a system where a roll over bar is provided through the bending of a tube. This is a very efficient and safe design with few welds and joints, thereby making it less prone to disintegration when subjected to large plastic deformations as in the case of a severe roll over crash.

DE 197 81 828 T1 discloses a roll over protection system where the bar is made out of only one extrusion, and is associated with a simple process to fabricate it. The bar legs are interconnected by means of an interconnecting plate that is partly cut away.

DE 195 23 790 discloses a roll over protection system where the two bars legs are interconnected by means of a plate. The plate extends along the main part of the extension of the bar legs.

SUMMARY OF THE INVENTION

The present invention relates to improvements regarding the behaviour of the roll over bar when the car turns over, and the bar hits the ground while the car is still moving.

In the case of a roll over accident situation, the car hitting the ground upside down, with the ROP units in place to take the crash forces, the units may imbed into the ground if the soil is soft (see FIG. 4a). In this situation, the units may, due to the forward motion and inertia of the car, be bent at their roots, where the bending moments are greatest. Prior art units having constant cross sections along their height will tend to be deformed where the bending moments are highest. When this happens, the protruding parts of the units may be bent somewhat backwards, and the protected room of the seated persons may be impaired.

It is understood that the term backwards here refers to the forward motion direction of the vehicle. It is furthermore understood, that in addition to the compounded said forward motion of the car together with the roll over motion, in an accident, the vehicle may also have a spin (rotation) around its vertical axis. This may take the effect of the car being upside down, sideways or backwards or in a position in-between, when hitting the ground. Again, the term backwards here refers to the initial forward motion direction of the vehicle. The same may happen also against solid ground, such as when hitting a curb.

It is understood that in a roll over accident, the vehicle may frequently rotate several times thus subjecting the ROP system to said strains successively, before it comes to a standstill.

It is an object of this invention to improve the behaviour of a ROP system when encountering soft soil or being otherwise hooked against the ground in a roll over accident.

In accordance with the present invention there is provided a top ROP unit which may be formed and fabricated out of one extrusion, or one sheet metal blank, including:

Main tube(s) (beams, bars) which is(are) tapered (reduced cross sections) at the top, making it possible to pre-determine an upper part, which will bend in the case of the unit embedding in soft soil or getting hooked against a solid object.

Alternatively, the tube(s) may have one or more areas (sections) where they are weakened, to achieve the same effect. It is understood that these reductions of strength and stiffness may be achieved through a variety of means such as indenting the cross section, providing weakening holes or manipulating the wall material locally to have less strength, for example through local heat-treatment.

When the tube is bent locally it will disengage the grip of the soil or object which holds it, and slide over it without getting further bent. This means that only a small part of the protected room will be lost in the case of hitting soft soil or a curb.

Provided that the system does not get hooked, it will not deform as said, but will remain upright like prior art systems under the same condition. In other words, they ROP system adapts to the particular need of the crash situation.

It is here however recognized, that the tubes may consist of separately fabricated tubes which are connected to each other by structural connection means.

To further increase the protected room, the parts of the system are so configured, that it is possible to extend them higher in the case of an accident, in the case that extendable units are used.

This is achieved through having a slim lower connection between the tubes of the top unit, together with an indented connection of limited height between the supporting walls of the cassette or transverse beam module taking up the crash forces from the top unit.

The lower connection can further be bent to provide an even slimmer connecting member.

The top unit may have several vertical tubes with a connecting member between them which increases the ski-like sliding surface of the tubes—against soft soil when the upper part of the top unit is bent.

It is understood that the bending of the tubes and connecting members may be a rather sharp bend, creating in effect a ramp at an angle against the gripping soil or objects. Conversely, and particularly against soft soil, the deformation action may be more of the nature of a gradual, rolling-up action, creating a beneficial rounded shape, like the tip of a ski.

For extendable systems, there is a guiding system that is independent of the walls of the main tubes, and these tubes can then be formed to have a tapering section.

Separating the guiding from the tubes as described above, furthermore makes the guiding action during the extension of the system less dependent on the tolerances of the tubes, which is beneficial both when it comes to the need for (costly) small tolerances, as well as securing a consistent action of extension.

The guiding system can be encapsulated, and may contain the crash extension spring(s), and may be injection molded in plastic. There may be two guide units, one inside or near each main tube, or a central guide unit only.

The main tubes may be of a square cross-section, possibly with inverted sidewalls. Other tube sections may be applied, such as circular or semi-circular, elliptical and of polygon type with a plurality of side surfaces, or any given combination of the cross-sections along the lengths of the tubes.

The top part of the main tubes may be peeled off during fabrication to enable a further tapering of the strength of the main tubes.

The remaining connecting plate (web) may be rolled to a tube or semi-tube, to produce an agreeable initial crash surface, at the same time as stiffening the connection between the main tubes.

The formed parts of the top unit, together with added parts such as an arresting toothed crash rack, may be secured by welding.

In accordance with the present invention it is possible to improve crash protection.

The improved protection level in the case of the car overturning and hitting soft ground, a curb or a curb-like object, will particularly together with a higher system, provide improved protection for the occupants of the vehicle.

This comes in addition to the reduced cost of such a system compared to the current ones, possibly enabling a more widespread use of such systems in passenger cars.

These and further advantages can be achieved in accordance with the present invention as defined in the accompanying claims.

BRIEF DESCRIPTION OF THE DRAWINGS

In the following, the invention shall be further described by examples and figures where.

DETAILED DESCRIPTION OF THE INVENTION

Figure 1:
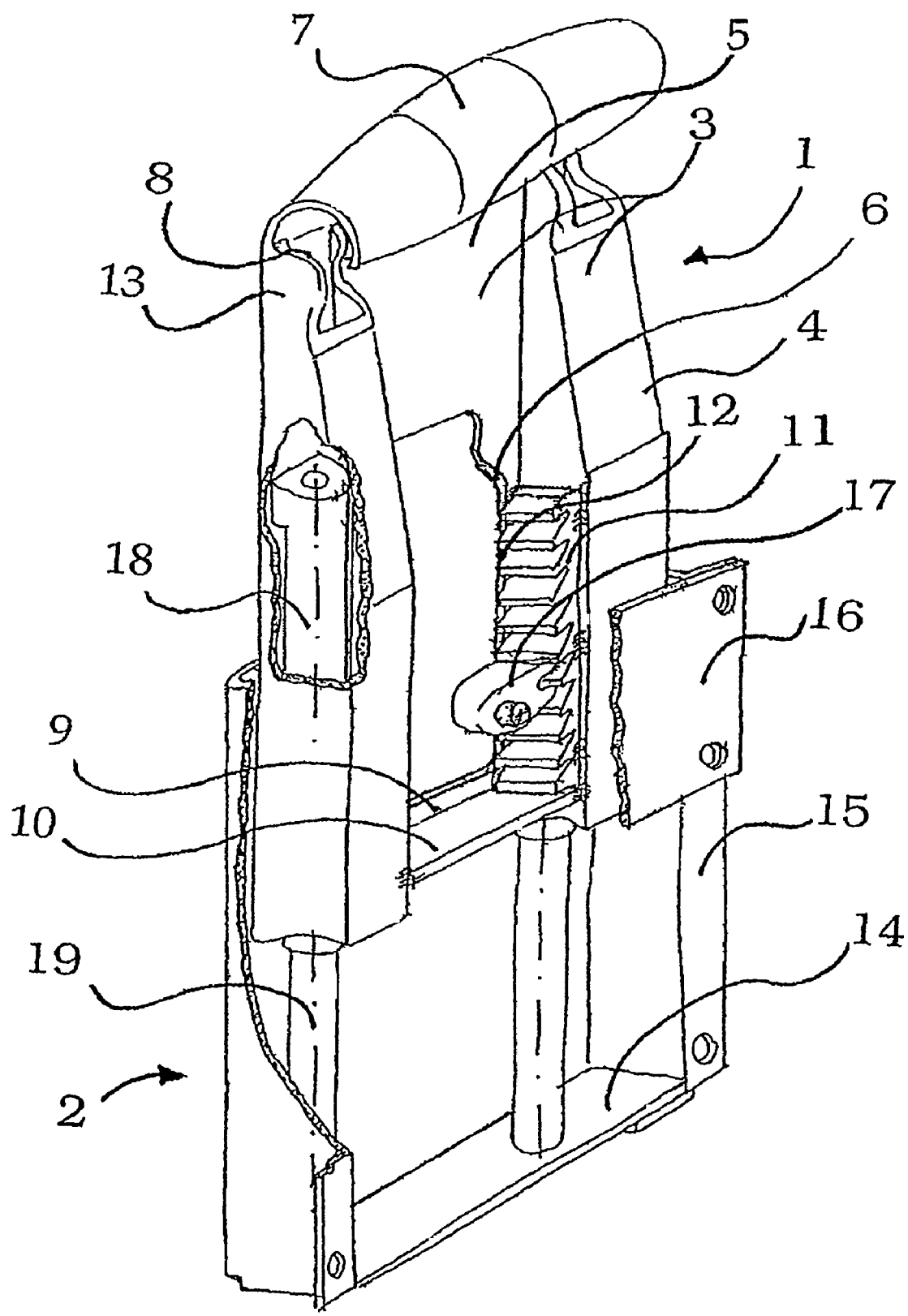
FIG. 1 is a perspective view of one embodiment of an extendable top unit.

In FIG. 1, reference numeral 1 represents an extendable top unit, and reference numeral 2 denotes a cassette housing that supports the top unit. The top unit includes one extruded element 3 which has two closed section tubes 4 that are integral with a connecting web 5. The web has a cut-out 6 which is higher than half of the height of the top unit. The web is rolled to form a semi-closed transverse section, called connecting member 7, which may be welded to the end surfaces 8 of the main tubes (welds not shown). It is understood that the flat side of the top unit is normally facing the forward direction of the vehicle. The lower transverse connecting web 9 may be bent to provide an L or U-shaped connection 10 between the tubes. A toothed rack 11 is fixed to a remaining edge 12 of the web and one main tube by welding.

The main tubes 4 may have inverted sidewalls 13, possibly at pre-determined parts of their extension (i.e. length) only. The cross-sections of the main tubes are manipulated to vary the strength of the tubes along their height. The end surfaces 8 of the tubes may be cut at an angle to continue the same effect upwards. The cassette 2 has an integral bottom plate 14, and attachment flanges 15 more or less extending the height of the cassette. A reinforcement profile 16 bridges the top parts of the flanges together, in combination with anchoring the locking finger 17 (details not shown).

Crash extension springs (not shown) are housed in the separate guiding tubes 18 and 19, which then not only guide the springs, but also the movement of the top unit in relation to the cassette.

The top tube 18 may be flanged to walls of the main tube, and secured, for example, by self-tapping screws (not shown).

Figure 2:
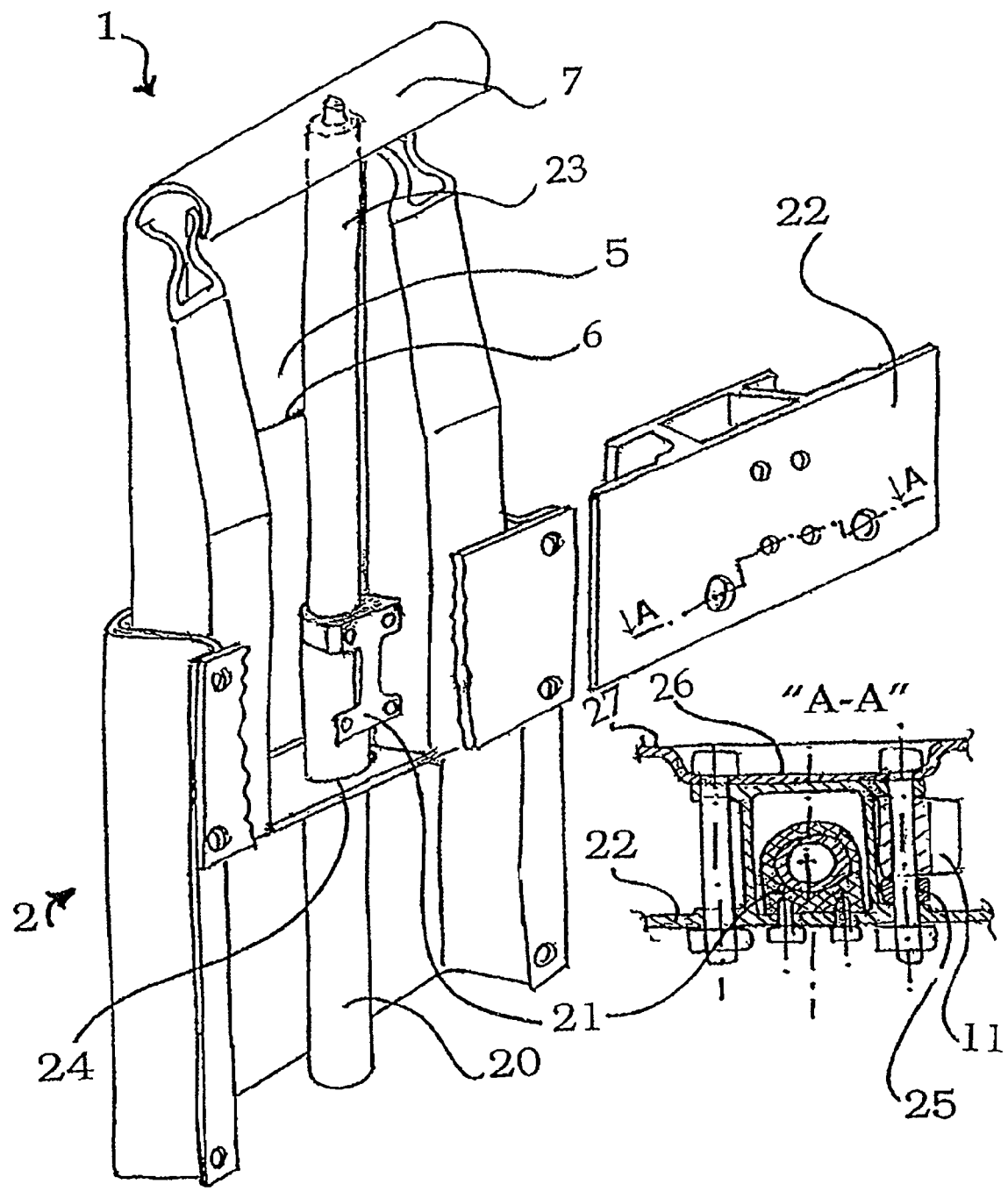
FIG. 2 is a perspective view of a second embodiment of an extendable top unit.

FIG. 2 shows a second embodiment of the invention, where the bottom of the cassette has been eliminated, and where a lower guiding tube 20 is secured to the reinforcement member 22 by screws or rivets. A top guiding tube 23 now acts directly upon the rolled-up portion 7, or is fixed to the top unit in some other fashion. Here the one centrally placed guiding unit may replace the previously used two units. The section "A-A" in FIG. 2 shows how the reinforcement section is bolted directly to an indentation 26 of the cassette. One bolt may provide the pivot for the arresting finger 11 and a concentric release arm 25.

It should be understood, that the edge 6 of the remaining web 5 will go between the reinforcement 22 and the cassette rear wall 27 where this wall is not indented.

It should be further understood that with this design, provided that a strong car structure allows it, the cassette 2 may be configured to be shorter (lower) than that of the prior art solutions.

Figure 3:
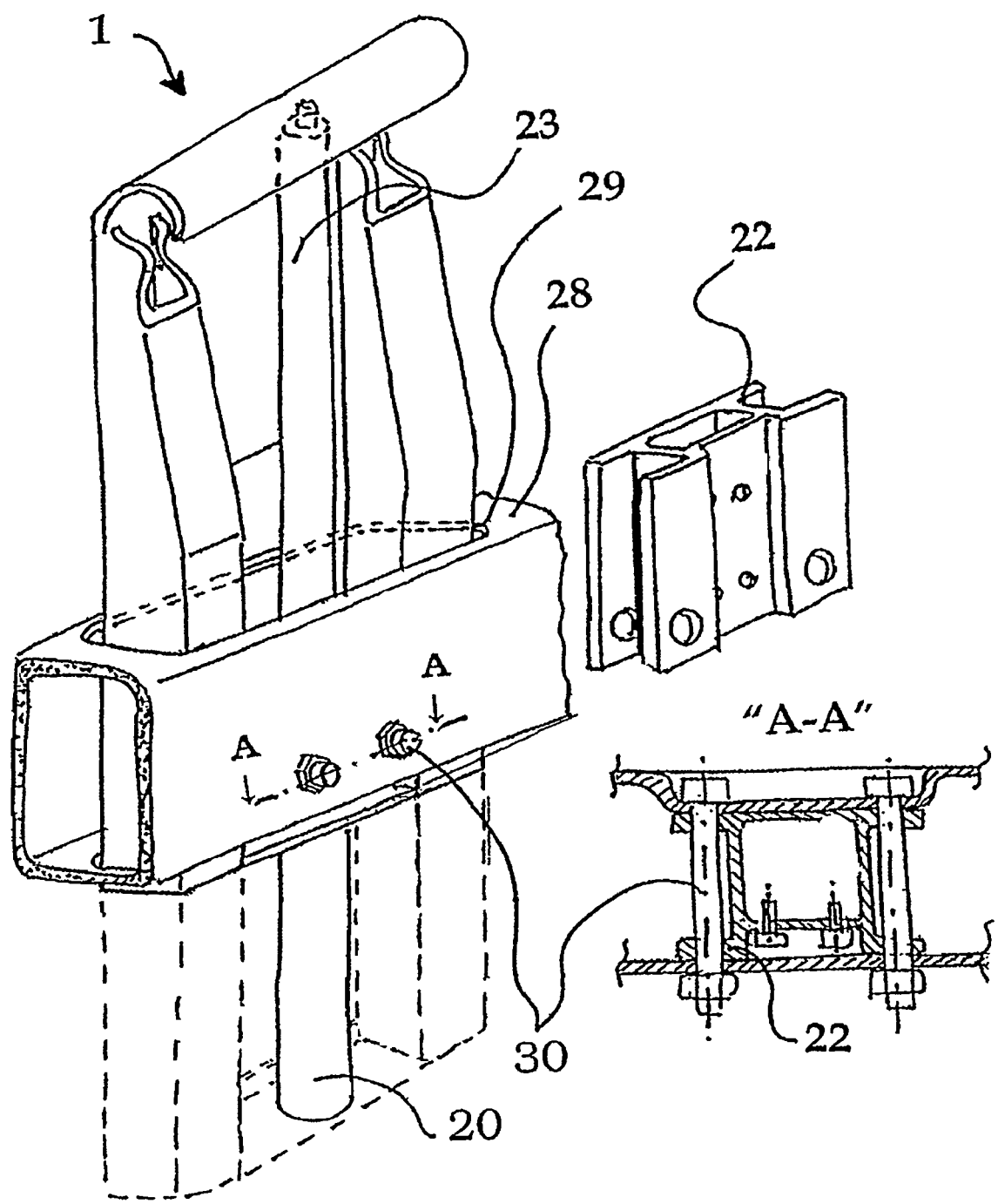
FIG. 3 is a perspective view of a third embodiment of an extendable top unit.

FIG. 3 shows a third embodiment of the top unit 1 where it has been adapted to a substantial cross beam 28 with apertures 29, to provide a ROP module (here a portion of one side shown only). Strength calculations have indicated, that such oblong apertures may not weaken the cross beam unduly as long as there are interconnecting bolts bridging the fore and aft sides of the beam. Here, the bolts 30 are again providing the pivots for the arresting finger as shown in FIG. 2 (here not shown), together with interconnecting the sides of the beam.

The reinforcement 22 is inside the beam, and will be mounted together with the top unit and the guiding tubes 20 and 23 all pre-assembled as one unit.

Figure 4A:
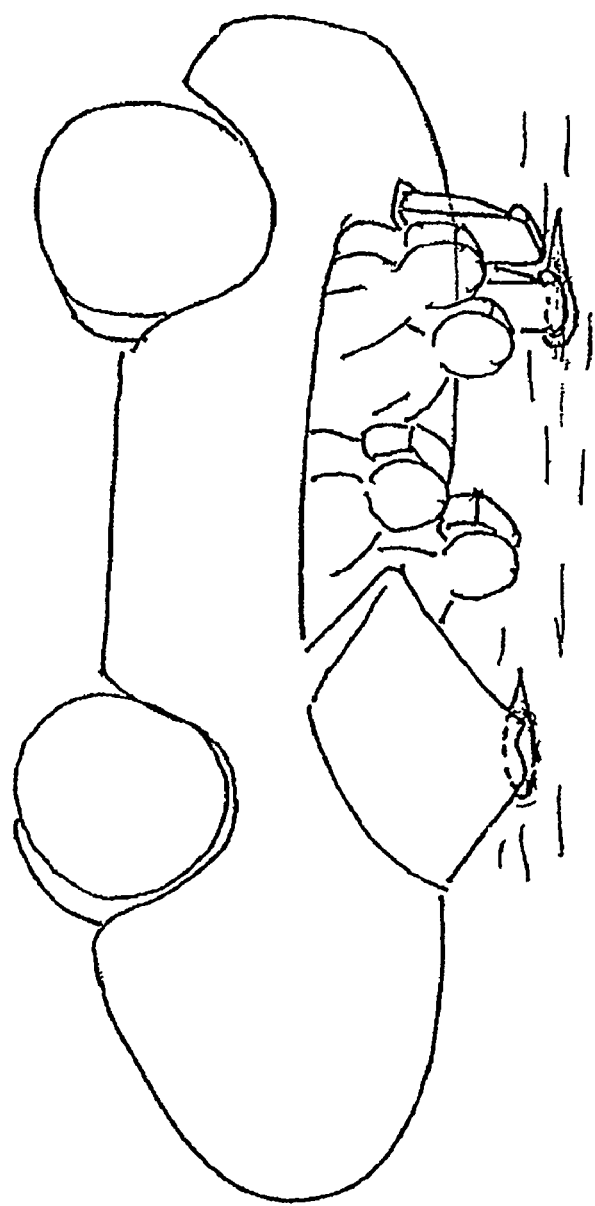
FIGS. 4a-d show the top unit in a turn over situation, where the car moves in an upside down position.

FIG. 4a shows a passenger car, protected by ROPS, in an overturning situation. The car has a forward motion compounded by the rolling action, and the edge of the windscreen is touching the ground together with one side of the ROPS.

Figure 4D:
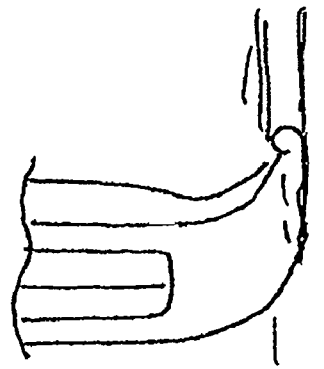
Figure 4C:
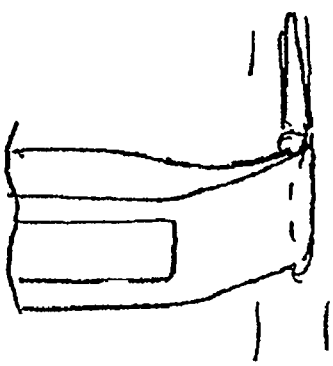
Figure 4B:
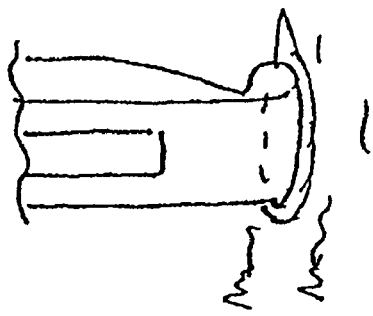

FIG. 4b shows an enlarged view of the initial contact between one ROP top unit and the ground, where the top unit is starting to embed (dig into) the relatively soft ground.

FIG. 4c shows the initial deformation of the top units following the force from the ground upon the system in the longitudinal direction of the car. The more the top of the main tubes are bent, the more the web between them will act as a skid-plate, lifting the car out of the grip of the soil. It is clear, that the more the top part is bent backwards, the more the weight and inertia-induced force from the car will support the local transformation bending of the main tubes.

Finally, in FIG. 4d a steady state situation has settled where the local deformation has created a skid-plate at a sufficient size and angle to enable the top of the units to slide on the ground with a reduced force, thus stopping any further deformation of the system.

FIGS. 4a-d show the action of the new system in a car that is moving forward during contact with the ground. It should be understood, that in the case of the car having spun 180 degrees around a vertical axis in addition to the overturning movement, the car will hit the ground with the rear end forwards in the direction of motion.

It is furthermore understood, that a similar beneficial deformation of the top unit will occur in this situation.

Figure 5:
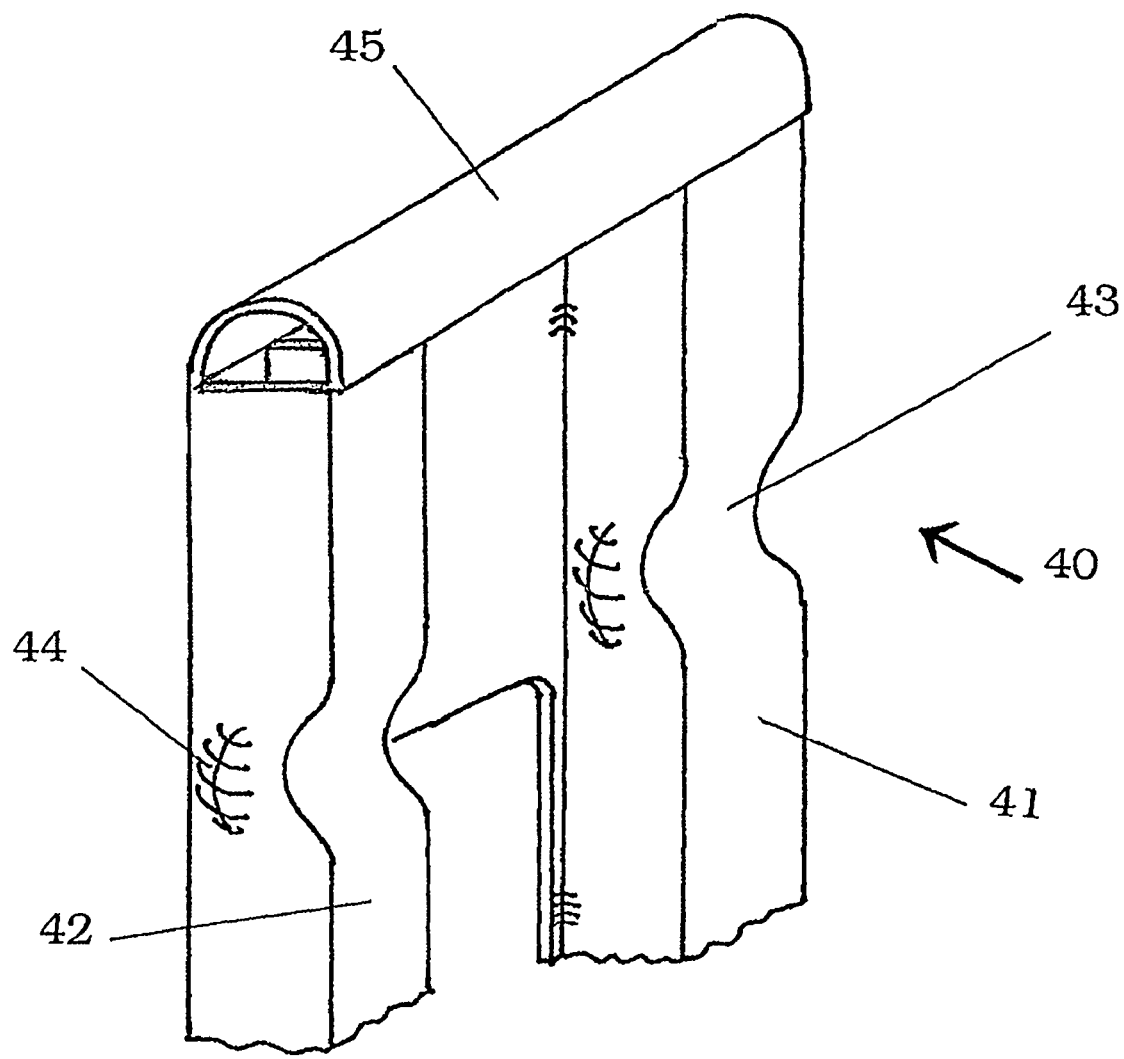
FIG. 5 shows a second embodiment of predefined deformation behaviour of the tube(s) of the top unit.

FIG. 5 discloses a part of a top unit 40 where the tubes 41, 42 are connected/terminated by a connecting or bridging member 45. The tubes may have one or more areas (sections) 43, 44 where they are weakened to achieve a predetermined deformation behaviour. The weakening of the tube(s) is done by indenting or compressing the cross section of the tube(s). It is understood that the tube(s) may have several weakened areas in succession along its (their) length, but differently weakened, to cater for eventual successive "hooking" impacts to the ROP system.

It should be understood that the locally arranged reductions of strength and stiffness in the tube(s) may be achieved through a variety of means. Other ways of achieving a predetermined deformation behaviour is to provide the tube(s) with weakening holes or manipulating the wall material locally to have less strength, for example through local heat-treatment.

In the examples there are shown various embodiments of the top unit. It should be understood that the principles of the invention can be exploited in other designs of a top unit as well, for instance top units using a conventional U-shaped bar, made out of one piece or plural pieces, and where its legs have weakened areas.

The invention claimed is:

1. A rollover protection system for a passenger vehicle, the roll over protection system comprising:
   at least one top unit having at least one substantially vertical beam or tube; and
   a connecting member provided at a top end of the at least one vertical beam or tube, wherein the at least one vertical beam or tube has a tapered section extending in a travel direction of the vehicle, the tapered section being located in an upper portion of the at least one vertical beam or tube so that, in the event of a crash, if the top unit gets hooked in soft soil or against solid objects or otherwise is subjected to corresponding high forces, an upper part of the top unit deforms by being bent backwards in the travel direction of the vehicle so that the at least one vertical beam or tube and the connecting member form a skid-plate against the ground while at the same time only negligibly impairing a space protected by the rollover protection system,
   wherein the at least one beam or tube has a locally arranged weakened section located in opposing walls at the tapered section.

2. The rollover protection system in accordance with claim 1, wherein the at least one tube or beam is tapered towards the top end thereof in the travel direction of the vehicle.

3. The rollover protection system in accordance with claim 1, wherein the at least one beam or tube has a plurality of weakened sections in succession along a length of the at least one beam or tube, wherein the weakened sections are differently weakened to accommodate eventual successive hooking impacts to the system.

4. The rollover protection system in accordance with claim 1, wherein the at least one tube or beam has a square cross-section.

5. The rollover protection system in accordance with claim 1, wherein the top unit is formed of a single extruded blank.

6. The rollover protection system in accordance with claim 5, wherein the top unit includes at least two tubes or beams, and at least one end of the blank is processed to form a closed or semi-closed member to stiffen a connection between the tubes or beams.

7. The rollover protection system in accordance with claim 1, wherein the at least one tube or beam has inverted sidewalls that are inverted in a direction that is perpendicular to the travel direction of the vehicle.

8. The rollover protection system in accordance with claim 1, wherein the top unit is made out of a single sheet metal blank.

9. The rollover protection system in accordance with claim 1, wherein the top unit is one single wide unit covering a width of the vehicle.

10. The rollover protection system in accordance with claim 1, wherein the rollover protection system includes two top units, and each of the top units covers one occupant seat in the vehicle.

11. A rollover protection system for a passenger vehicle, the rollover protection system comprising:
   at least one top unit having at least one substantially vertical beam or tube; and
   a connecting member provided at a top end of the at least one vertical beam or tube, wherein the at least one vertical beam or tube has a tapered section extending in a travel direction of the vehicle, the tapered section being located in an upper portion of the at least one vertical beam or tube so that, in the event of a crash, if the top unit gets hooked in soft soil or against solid objects or otherwise is subjected to corresponding high forces, an upper part of the top unit deforms by being bent backwards in the travel direction of the vehicle so that the at least one vertical beam or tube and the connecting member form a skid-plate against the ground while at the same time only negligibly impairing a space protected by the rollover protection system,
   wherein the top unit includes a releasable spring loaded system and movement of the top unit is guided by at least one guide unit disposed inside or adjacent the at least one vertical beam or tube.

12. A rollover protection system for a passenger vehicle, the roll over protection system comprising:
   a top unit including at least two substantially vertical beams or tubes; and
   a connecting member provided at top ends of the vertical beams or tubes, wherein each of the vertical beams or tubes has a tapered section extending in a travel direction of the vehicle, the tapered section being located in upper portions of the vertical beams or tubes so that, in the event of a crash, if the top unit gets hooked in soft soil or against solid objects or otherwise is subjected to corresponding high forces, an upper part of the top unit deforms by being bent backwards in the travel direction of the vehicle so that the vertical beams or tubes and the connecting member form a skid-plate against the ground while at the same time only negligibly impairing a space protected by the rollover protection system,
   wherein the top unit includes a releasable spring loaded system and movement of the top unit is guided by a guide unit that is centrally disposed with respect to the vertical beams or tubes.

* * * * *